ed, at its upper end, a central vertical bar

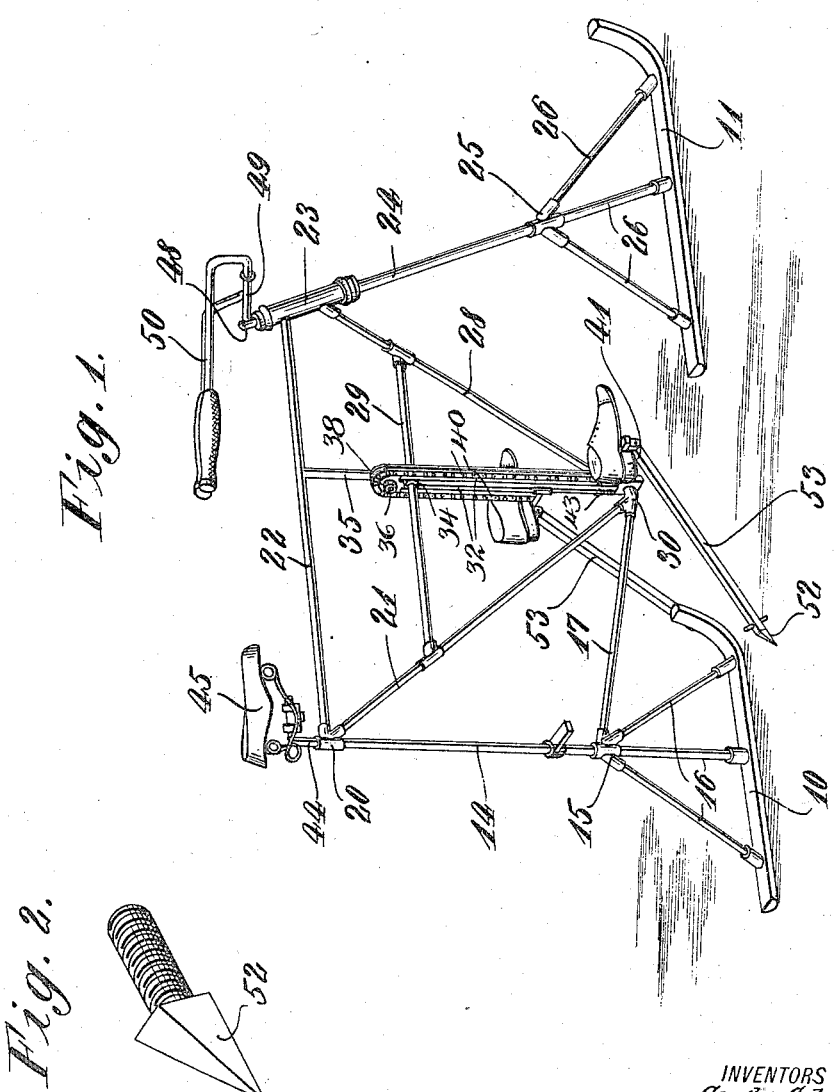

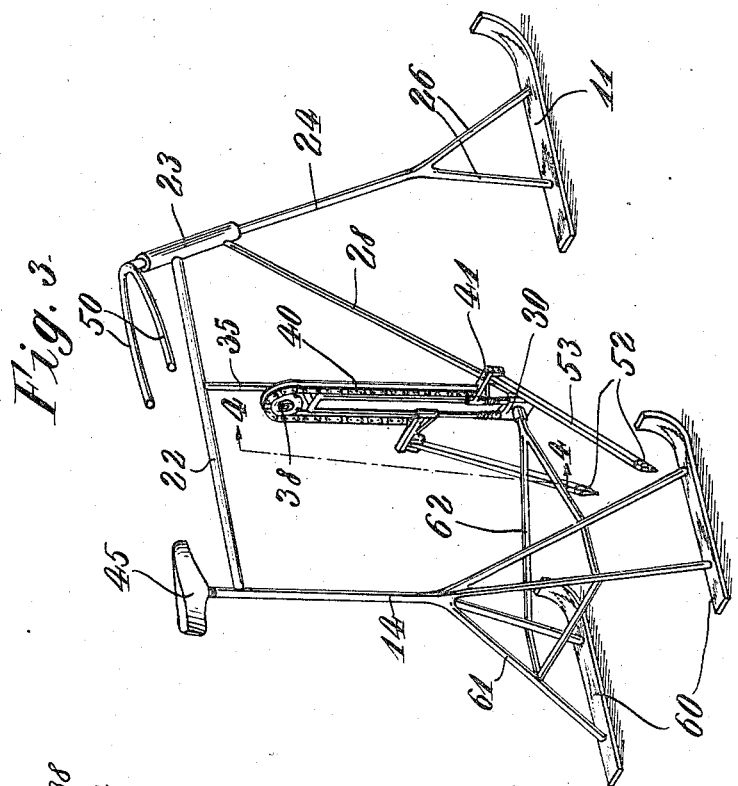

UNITED STATES PATENT OFFICE.

GUSTAV SCHWITTAI AND HYMAN DAVIDOVITZ, OF NEW YORK, N. Y.

BICYCLE-SLED.

1,242,990. Specification of Letters Patent. Patented Oct. 16, 1917.

Application filed June 28, 1917. Serial No. 177,436.

*To all whom it may concern:*

Be it known that we, GUSTAV SCHWITTAI, a subject of the Emperor of Germany, resident of New York, county of New York, and State of New York, and HYMAN DAVIDOVITZ, a citizen of the United States, resident of New York, county of New York, and State of New York, have invented certain new and useful Improvements in Bicycle-Sleds, of which the following is a specification.

This invention relates to improvements in vehicles and particularly those adapted to be propelled over the surface of snow or ice.

The principal object of the invention is to provide a vehicle of the class described which may be propelled across surfaces, as ice or snow, the means of propulsion being furnished by the rider.

A further object is to provide such vehicles in forms which may be readily steered, the vehicles being used for either business or pleasure purposes, and comprised of few, simple and light parts of a strong and durable nature.

These and other like objects are attained by the novel construction and combination of parts hereafter described and shown in the accompanying drawings, forming a material part of this disclosure, and in which—

Figure 1 is a perspective view showing a bicycle sled made in accordance with the invention.

Fig. 2 is an enlarged perspective view showing one of the engaging spurs.

Fig. 3 is another perspective view showing a modified form of vehicle, and

Fig. 4 is an enlarged vertical sectional view, the section being taken substantially on line 4—4 of Fig. 3.

In the simpler form of the invention, as indicated in Fig. 1, a pair of runners 10 and 11 are arranged in tandem, the former having attached to it upon its upper side a central standard 14, passing through a fitting 15, with which is engaged braces 16 and also a frame member 17, while near the top of the standard 14 is another fitting 20, in one opening of which is connected a strut 21 and in the other a horizontal bar 22, engaged at the opposite end with a sleeve 23, in which is rotatably, but non-slidably, mounted an inclined front support 24, passing through fittings 25, one side of which is engaged with the front runner 11, and supported by the braces 26.

Another angularly disposed brace 28 is engaged with the sleeve 23, this brace like the strut 21, being further secured by the connecting element 29, both brace and strut terminating in a bracket element 30, in which is attached two vertical bars 32, the same extending upward to the inturned connecting elements 33, engaged with the bracket 34, through which the connecting element 29 extends, and to which is connected, at its upper end, a central vertical bar 35 attached to the horizontal bar 22.

Rotatably mounted on the stem 36 secured to the bracket 34, is a sprocket wheel 38, over which runs a chain 40, its ends communicating directly with pedals 41, attached by means of sleeves 42 to the vertical bars 32, and upon which they are free to slide, springs 43 encircling the lower end of the bars 32 so as to cushion the downward movement of the sleeves 42.

A seat support 44 is formed at the extreme upper end of the standard 14, upon which is attached a saddle 45 while the extreme upper ends 48 of the angularly disposed strut supports 24 has engaged the elements 49 of the handle bars 50, in such manner that a person resting upon the saddle 45 may compel the direction of the sled and at the same time by alternately raising and lowering the feet, cause the sled to be propelled by reason of the spurs 52 attached to the levers 53 hingedly engaged at their upper ends with the pedals 41, the upper ends of the levers 53 being alternately raised and lowered by action of the pedals in an obvious manner, thereby causing the spurs 52 to be raised and moved forward as the sled advances during the upstroke, and to engage with the surface upon the downstroke, thereby causing the sled to be propelled.

In the form shown in Fig. 3, in place of the single runner, a pair of runners 60 are disposed side by side, the standard 14 terminating in branches 61 engaged with the upper side of the runners, and are connected by an appropriately formed frame 62, the construction being in all other respects as before described.

Having thus described our invention, what we claim as new, and desire to secure by Letters Patent, is:—

1. In a sled, the combination with a frame having runners at the front and rear thereof, a seat mounted on said frame, and means for steering the front runner, of a pair of vertical rods secured to said frame, sleeves slidably mounted on said vertical rods, pedals carried by said sleeves, means engaging between said pedals compelling alternate action thereof, and spurred levers hingedly engaged with said pedals, said levers being adapted to contact with the surface over which the sled is moving and advance the same by a step by step movement.

2. In a sled, the combination with a rigid frame having one or more rear runners, a dirigible front runner at the front of said frame, and a seat carried by said frame, of a pair of vertical bars secured to said frame, sleeves slidably mounted on said bars, brackets extending from said sleeves, said brackets being adapted to be operated by the foot of a rider, a pair of levers, each hingedly engaged with said brackets, and sharp spurs removably engaged in the free ends of said levers.

3. In a sled, the combination with a rigid frame having a seat mounted thereon, one or more rear runners attached to said frame, and a single dirigible runner at the front of said frame, of a pair of parallel vertical bars carried by said frame, brackets slidably engaged upon each of said vertical bars, said brackets being adapted to be operated by the foot, a pulley carried at the top of said bars, a chain engaged with each of said brackets running over said pulley, and a pair of sharp spurred levers hingedly engaged with said brackets, adapted to be alternately advanced and retracted as said brackets are operated.

In testimony whereof we have affixed our signatures.

GUSTAV SCHWITTAI.
HYMAN DAVIDOVITZ.

Copies of this patent may be obtained for five cents each, by addressing the "Commissioner of Patents, Washington, D. C."